United States Patent [19]

Cook

[11] Patent Number: 4,662,604

[45] Date of Patent: May 5, 1987

[54] FORCE BALANCED EGR VALVE WITH POSITION FEEDBACK

[75] Inventor: John E. Cook, Chatham, Canada

[73] Assignee: Canadian Fram Limited, Chatham, Canada

[21] Appl. No.: 739,581

[22] Filed: May 30, 1985

[51] Int. Cl.[4] ........................ F16K 31/04; F16K 39/00

[52] U.S. Cl. ........................ 251/129.07; 251/129.17; 251/282; 123/568; 123/571

[58] Field of Search ........................ 123/571, 568; 251/129.07, 129.17, 282; 92/97; 137/554

[56] References Cited

U.S. PATENT DOCUMENTS

| | | | |
|---|---|---|---|
| 2,197,352 | 4/1940 | Terkel | 251/322 X |
| 3,336,940 | 8/1967 | Fitzpatrick | 137/494 |
| 4,122,810 | 10/1978 | Berriman | 123/568 |
| 4,256,076 | 3/1981 | Bradshaw | 123/568 |
| 4,300,515 | 11/1981 | Straubel et al. | 123/568 |
| 4,333,440 | 6/1982 | Eheim | 123/569 |
| 4,342,331 | 8/1982 | Bartholomäus et al. | 137/553 |
| 4,366,799 | 1/1983 | Suda | 123/568 |
| 4,442,820 | 4/1984 | Ina et al. | 123/571 |

FOREIGN PATENT DOCUMENTS

| | | | |
|---|---|---|---|
| 1201343 | 12/1959 | France | 251/282 |
| WO81/02615 | 9/1981 | PCT Int'l Appl. | 251/282 |

*Primary Examiner*—Randall L. Green
*Assistant Examiner*—Allen J. Flanigan
*Attorney, Agent, or Firm*—Markell Seitzman; Russel C. Wells

[57] ABSTRACT

An EGR valve for an engine comprising: a housing including a plurality of passages for communicating exhaust gas and engine vacuum thereto, for supporting a movable diaphragm-piston assembly, a diaphragm-piston assembly for dividing the housing into an atmospheric chamber and a vacuum chamber, including a user cleanable, outwardly movable valve closure element for selectively sealing one of said passages and means for sensing the position of the assembly.

10 Claims, 2 Drawing Figures

FORCE BALANCED EGR VALVE WITH POSITION FEEDBACK

BACKGROUND AND SUMMARY OF THE INVENTION

The present invention relates to EGR valves and in particular EGR valves including a force balanced diaphragm-piston assembly and outwardly opening valve closure element to permit cleaning of same.

Exhaust gas recirculation (EGR) valves form an integral part of the exhaust gas purification system of internal combustion engines. The EGR valve is utilized to recirculate a predetermined amount of the exhaust gas back to the intake manifold of the engine. The amount of exhaust gas permitted to flow back to the intake manifold is usually controlled in an open loop fashion by controlling the flow area of the valve. Such open loop control makes it difficult to accurately control the percentage of exhaust gas flow over the useful life of the valve as the various components of the valve wear, or due to the variability of the vacuum signals communicated to such valves. To overcome the lack of consistently available vacuum to control a moveable diaphragm, electrically actuated solenoids have been used to replace the totally vacuum actuated diaphragm. Further, EGR valves typically utilized an inward opening valve closure element which is moved into its protective housing relative to a cooperating valve seat. Over the useful life of such valves carbon accumulates on the valve closure element and upon its valve seat thereby preventing the valve from completing closing. Such valve closure elements are positioned within the housing or body of the EGR valve and make it impossible to clean the valve closure element and the valve seat thereby necessitating replacement of this integral pollution system component.

It is therefore an object of the present invention to provide an EGR valve which is devoid of the deficiencies of the prior art. A further object of the present invention is to provide an exhaust gas recirculation valve which is capable of having its valve seat and closure element cleaned thereby permitting the valve to be reinstalled.

A further object of the present invention is to provide an EGR valve having position feedback capability thereby permitting the accurate control of the percent of exhaust gas permitted to flow into the intake manifold of the engine.

An additional object of the present invention is to provide an EGR valve having a forced balanced diaphragm-piston assembly thereby permitting solenoid activation thereof utilizing a minimum activation force thereby yielding a rapidly responding, actuately positionable valve.

Accordingly, the invention comprises an EGR valve for an engine comprising means for mounting the valve to an engine, including an inlet adapted to receive exhaust gas, and an outlet adapted to receive engine vacuum and adapted to communicated the received exhaust gas to the intake of the engine and a valve seat positioned about the inlet on an exterior surface thereof. The valve including housing means supported by the mounting means including an atmospheric chamber and a vacuum chamber. The housing means including means for communicating vacuum to the vacuum chamber and a pressure balanced diaphragm-piston assembly supported by the housing means for dividing the housing means into the atmospheric and vacuum chambers. The assembly comprises: a plate supported at its outer periphery by the housing means, the plate including an opening substantially aligned with said inlet, and a flexible diaphragm having an outer portion supported by the plate about said opening, and a flexible inner portion defining an annular opening. The assembly further includes piston means comprising an upper element adapted to receive the inner portion of the diaphragm, a rod extending from the upper element through the inlet and an outward opening valve closure element for seating upon the valve seat. The valve further includes a solenoid assembly responsive to control signals input thereto comprising a movable armature and a rod extending therefrom for engaging the upper element and for moving the piston means outwardly off from said valve seat; biasing means supported within the housing means for urging the piston means into the housing and upon the valve seat; and means for sensing the position of the piston means.

Many other objects, features, advantages and purposes of the invention will be clear from the detailed description of the drawings.

DETAILED DESCRIPTION OF THE DRAWING

Figure 1:
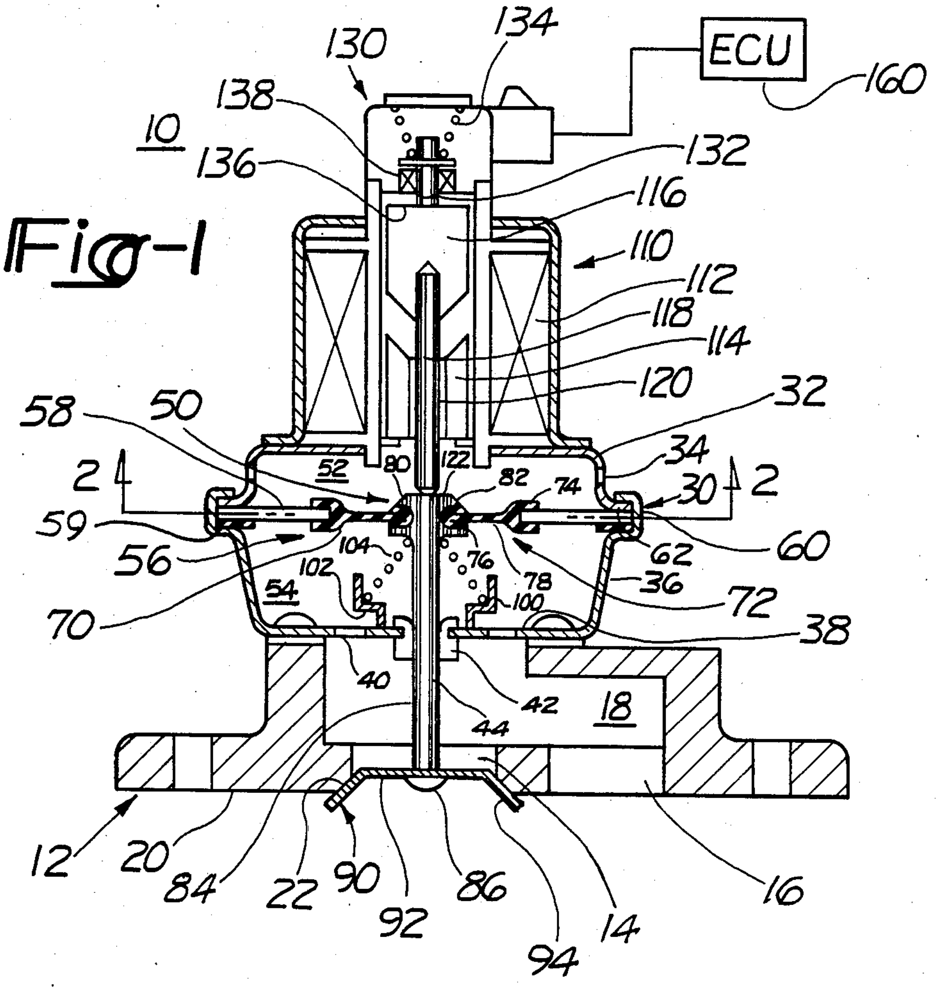
FIG. 1 shows a cross-sectional view of an EGR valve constructed in accordance with the present invention.

With reference to FIG. 1 there is illustrated an EGR valve 10 comprising a base 12 adapted to be mounted to an internal combustion engine. The base comprises an inlet 14 adapted to receive exhaust gases and an outlet 16 communicated to the intake manifold of the engine and an internal volume or passage 18 communicating the inlet 14 and outlet 16. The base 12 further includes a mounting surface 20. Formed about the inlet 14 proximate the mounting surface 20 is a valve seat 22. Mounted to the base by conventional means is a housing 30 comprising an upper member 32 including a plurality of vent holes 34 communicated to atmosphere. The housing 30 further includes a lower member 36 mounted to the base 12 in communication with the passage 18. The lower member 36 includes a bottom portion 38 including a plurality of openings 40 for communicating engine vacuum into the housing 30. Centrally positioned on the bottom portion 38 is a valve guide means comprising an axially extending boss 42 having an opening 44 for receipt of a piston means 50. The housing 30 is separated into an atmospheric chamber 52 and a vacuum chamber 54 by a diaphragm-piston assembly generally shown as 56. The diaphragm-piston assembly 56 comprises a generally circular, rigid plate 58 which is secured at its outer periphery at the juncture of the lower member 36 and upper member 32 of the housing. To enhance the seal therebetween, a rubber gasket 59 may be formed on the underside of the plate 58. The housing members 32 and 36 respectively may be joined together thereby securing the plate 58 by crimping a portion 60 of the lower member 36 about a cooperating portion 62 of the upper member 32.

Figure 2:
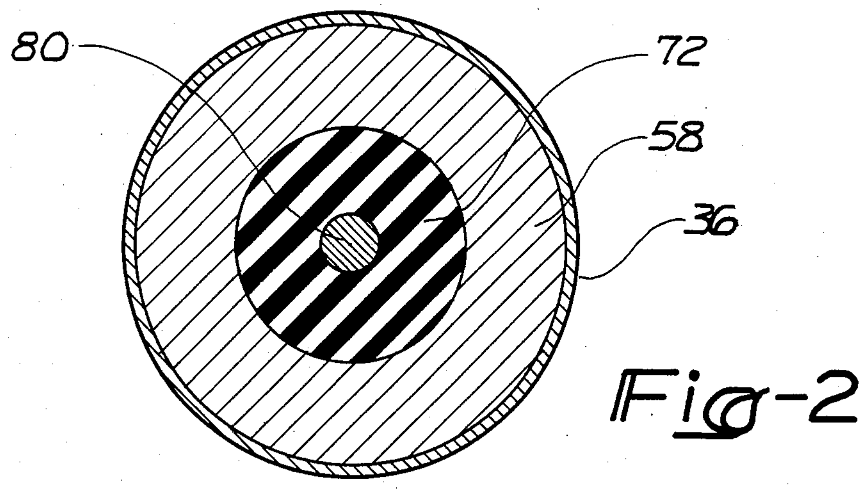
FIG. 2 illustrates a cross-sectional view of a diaphragm assembly taken through section 2—2 of FIG. 1.

The diaphragm-piston assembly 56 further includes an opening 70 concentric with the opening 44 in the boss 42. Secured to the opening 70 is a flexible diaphragm 72 further shown in FIG. 2 comprising an outer portion 74 which may be insert molded to the plate 58, a flexible inner portion 76 such as an O-ring defining an annular opening 77 and a thin flexible medial portion 78 joining the inner and outer portions 74 and 76, respectively.

Fitted to the inner portion 76 of the diaphragm-piston assembly 56 is the piston means 50. The piston means 50 comprises an upper element 80 including an annular slot 82 that is adapted to receive the inner portion 76 of the diaphragm 72. The piston means 50 further includes a rod 84 extending from the upper element 80. The rod 84 is slidably received within the opening 44 of the valve guide means 42 and extends into the inlet 14. Fastened to the outer extending end 86 of the rod 84 is a valve closure element generally designated as 90. The valve closure element 90 includes a central plate 92 and a frusto-conical wall 94 extending therefrom which is adapted to seat upon the valve seat 22. The wall 94 preferably extends beyond the mounting surface 20 of the base 12 such that the valve closure element 90 can be moved off from the valve seat 22 to permit cleaning of the valve closure element and valve seat 22.

In the preferred embodiment of the invention the cross-sectional area across the medial portion 78 of the diaphragm-piston assembly 56 is equal to the cross-sectional area of the inlet 14. As can be seen from FIG. 1, vacuum is communicated to the interior passage 18 and acts upon the valve closure element and the lower surface of the medial portion 78 of the diaphragm 72. Constructing the diaphragm-piston assembly 56 as described above, balances the forces created by manifold vacuum acting upon the valve closure element 90 and the diaphragm 72 and further eliminates stem or rod sealing problems. Having the diaphragm balance out the force created by vacuum acting on the valve 90 enables one to use a smaller solenoid for valve actuation.

The elimination of valve stem seal problems offers the following advantages:

(i) eliminates vacuum losses, which is important since engines now are using slower idle speeds and any air entering the engine will increase idle speed.

(ii) It is difficult to incorporate an airtight stem seal that does not deteriorate due to carbon build-up or the high temperatures seen in this area.

Positioned upon the bottom 38 of the lower member 36, within the vacuum chamber 54, is a spring retainer 100 comprising an annular shoulder 102 for receipt of a biasing spring 104 which biases the piston means inwardly thereby causing the valve closure element 90 to close communication through the inlet 14.

Attached to the upper member 32 of the housing 30 is a solenoid assembly generally designated 110. The solenoid assembly comprises a coil 112 responsive to electrical signals input thereto. Positioned within the coil 112 concentric to the opening 44 is a stator means 114. The solenoid assembly 110 further includes an armature 116 movable in response to the magnetic field generated upon activation of the coil 112. Extending from the armature 116 is a nonmagnetic rod 118 which is slidably received through an opening 120 in the stator means 114. The rod 118 extends into the atmospheric chamber 52 and engages an engagement surface 122 formed at the top of the upper element 80 of the piston means 50.

Positioned upon the solenoid assembly is a valve position sensor assembly 130 comprising a pin 132 biased by a spring 134 into engagement with a surface 136 of the armature 116. The valve position sensor assembly 30 further includes means 138 for determining the position of the pin 132 and thereby for determining the position armature 116 and piston means 50. In the illustrated embodiment of the invention such position means 136 comprises an LVDT 138 of known construction, which is merely shown schematically. Other such position sensor means may be substituted for the LVDT such as a resistive network of a known variety.

In operation the engine perameters are monitored by an electronic control unit 160 of a known variety. In response to changes in the engine operating parameters the ECU 160 generates commands to the coil 112 thereby causing the armature 116 to move dowmward as viewed in FIG. 1 thereby moving the valve closure element 90 off from its seat 22 to permit a predetermined amount of exhaust gas to flow from inlet 14 into the intake manifold through the outlet 16. The position of the piston means 50 is monitored by the ECU 160 by monitoring the output of the position sensor 138 thereby permitting accurate control of the positioning of the piston means 50.

As can be seen from the above, the forces acting upon the diaphragm-piston assembly 56 comprise the vacuum forces generated by the intake manifold, the restoring the force generated by the spring 104 and the drive force imparted to the piston means by the rod 118. However, by utilizing the force balanced diaphragm-piston assembly the manifold vacuum forces imparted to the diaphragm 72 and to the valve closure element 90 of the piston means 50 are substantially cancelled and consequently the solenoid assembly 110 must only generate forces necessary to overcome the return force imparted by the spring 104.

Further, during the operation of the EGR within the highly caustic environment of the exhaust gases contaminates will tend to accumulate on the valve seat 22 and upon the valve closure element 90. Upon removing the EGR valve 10 from the engine the valve closure element 90 may be retracted from the valve seat 22 thereby enabling the valve closure element 90 and valve seat 22 to be cleaned and the valve 10 restored to the engine thereby increasing the useful life of the valve 10.

Many changes and modifications in the described embodiment of the invention can of course be carried out without departing from the scope thereof. Accordingly, that scope is intended to be limited only by the scope of the appended claims.

What is claimed is:

1. An EGR valve for an engine comprising:

means for mounting said valve to an engine, including an inlet adapted to receive exhaust gas, and an outlet adapted to receive engine vacuum and adapted to communicate said received exhaust gas to the intake of the engine and a valve seat positioned about said inlet on an exterior mounting surface thereof;

housing means supported by said mounting means including an atmospheric chamber and a vacuum chamber, said vacuum chamber positioned adjacent said mounting means, said housing means including means for communicating vacuum from said mounting means to said vacuum chamber;

diaphragm-piston assembly supported by said housing means for dividing said housing means into said atmospheric and vacuum chambers and for balancing the pressure forces resulting from vacuum pressure exerted upon a flexible diaphragm and upon a valve closure element, said assembly comprising:

a plate supported at its outer periphery by said housing means, said plate including an opening substantially aligned with said inlet for supporting said flexible diaphragm, said flexible diaphragm having an outer portion supported by said plate about said opening, and a flexible inner portion defining an annular opening, said inner portion being substantially the same size as said inlet;

piston means comprising an upper element supported within said annular opening and movable with said inner portion of said diaphragm, a first rod extending from said upper element through said inlet and a valve closure element movable with said first rod away from said exterior mounting surface for seating upon said valve seat;

a solenoid assembly responsive to control signals input thereto comprising a movable armature and a second rod extending therefrom for engaging said upper element and for moving said valve closure element outwardly off from said valve seat;

biasing means supported within said housing means for urging said piston means into said housing and for urging said valve closure element upon said valve seat.

2. The valve as defined in claim 1 wherein said solenoid assembly further comprises:

an electric coil wound about a bobbin, said bobbin including an axially extending first passage positioned above said piston means; a stator including a second passage through which said second rod extends, said stator positioned at one end of and partially extending through said first passage proximate said atmospheric chamber, said armature slidably positioned within said first passage remote from said stator and wherein said armature and said stator include mutually conforming surfaces, which upon activation of said coil, engage to limit the outward motion of said armature and thereby limit the outward motion of said valve closure element.

3. The valve as defined in claim 2 wherein said armature further includes a receiving surface oppositely positioned from its corresponding conforming surface for receiving a pin, said pin positioned upon said receiving surface and spring means supported within said housing for urging said pin into contact with said receiving surface.

4. The valve as defined in claim 1 wherein said valve closure element includes a central flat portion and frusto-conical walls extending therefrom for mating with said valve seat wherein said walls extend from within said inlet outwardly beyond said exterior surface enabling said valve closure element to be moved off from said valve seat to permit the removal of particulates which may have accumulated on said valve closure element and said valve seat.

5. An EGR valve for an engine comprising:

housing means for supporting a movable diaphragm-piston assembly comprising a base including an exterior surface adapted to be mounted to the engine, and a plurality of passages for communicating exhaust gas and engine vacuum thereto and a housing, attached to said base, comprising a bottom portion including a plurality of openings therein in directed communication with said plurality of passages, a diaphragm-piston assembly for dividing said housing into an atmospheric chamber and a vacuum chamber, said vacuum chamber being formed between said assembly and said bottom portion, said assembly including a user cleanable, valve closure element outwardly movable beyond said exterior surface for selectively sealing one of said passages at a valve seat, said valve seat formed at the intersection of said one passage and said exterior surface including means, extending beyond said exterior surface, for permitting said valve closure element to be moved outwardly when said valve has been removed from said engine.

6. The valve as defined in claim 5 wherein said one passage is adapted to receive engine exhaust gas.

7. The valve as defined in claim 6 wherein said valve closure element includes a central flat portion and frusto-conical walls extending therefrom for mating with said valve seat wherein said walls extend from within said one passage outwardly beyond said exterior surface enabling said valve closure element to be moved off from said valve seat to permit the removal of particulates which may have accumulated on said valve closure element and said valve seat.

8. The valve as defined in claim 7 wherein said diaphragm-piston assembly is vacuum pressure balanced.

9. The valve as defined in claim 8 wherein said diaphragm-piston assembly comprises:

a plate supported at its outer periphery by said housing, said plate including an opening substantially aligned with said inlet, a flexible diaphragm having an outer portion supported by said plate about said opening, and a flexible inner portion defining an annular opening;

piston means comprising an upper element adapted to receive said inner portion of said diaphragm a rod extending from said upper element through said inlet and supporting said valve closure element for seating upon seat valve seat.

10. An EGR valve for an engine comprising:

means for mounting said valve to an engine, including an inlet adapted to receive exhaust gas, and an outlet adapted to receive engine vacuum and adapted to communicate said received exhaust gas to the intake of the engine and a valve seat positioned about said inlet on an exterior mounting surface thereof;

housing means supported by said mounting means including an atmospheric chamber and a vacuum chamber, said housing means including means for communicating vacuum to said vacuum chamber;

diaphragm-piston assembly supported by said housing means for dividing said housing means into said atmospheric and vacuum chambers and for balancing the pressure forces resulting from vacuum pressure exerted upon a flexible diaphragm and upon a valve closure element, said assembly comprising:

a plate supported at its outer periphery by said housing means, said plate including an opening substantially aligned with said inlet for supporting said flexible diaphragm, said flexible diaphragm having an outer portion supported by said plate about said opening, and a flexible inner portion defining an annular opening, said inner portion being substantially the same size as said inlet;

piston means comprising an upper element supported within said annular opening and movable with said inner portion of said diaphragm, a first rod extending from said upper element through said inlet and a valve closure element movable with said first rod away from said exterior mounting surface for seating upon said valve seat;

wherein said valve closure element includes a central flat portion and frusto-conical walls extending therefrom for mating with said valve seat wherein said walls extend from within said inlet outwardly beyond said exterior surface enabling said valve closure element to be moved off from said valve seat to permit the removal of particulates which may have accumulated on said valve closure element and said valve seat;

a solenoid assembly responsive to control signals input thereto comprising a movable armature and a second rod extending therefrom for engaging said upper element and for moving said valve closure element outwardly off from said valve seat;

an electric coil wound about a bobbin, said bobbin including an axially extending first passage positioned above said piston means; a stator including a second passage through which said second rod extends, said stator positioned at one end of and partially extending through said first passage proximate said atmospheric chamber, said armature slidably positioned within said first passage remote from said stator and wherein said armature and said stator include mutually conforming surfaces, which upon activation said coil, engage to limit the outward motion of said armature and thereby limit the outward motion of said valve closure element;

wherein said armature further includes a receiving surface oppositely positioned from its corresponding conforming surface for receiving a reciprocating pin, said pin biased upon said receiving surface and spring means supported within said housing for biasing said pin into contact with said receiving surface and means for sensing the position of said pin and hence the position of said piston means;

biasing means supported within said housing means for urging said piston means into said housing and for urging said valve closure element upon said valve seat.

* * * * *